United States Patent [19]

Pettesch et al.

[11] Patent Number: 5,593,116
[45] Date of Patent: Jan. 14, 1997

[54] HOSE RETRACTOR

[75] Inventors: Martin C. Pettesch, Cranford; Douglas T. Main, Jr., Basking Ridge; Robert J. Milo, Chatham, all of N.J.

[73] Assignee: Universal Valve Co., Inc., Elizabeth, N.J.

[21] Appl. No.: 320,293

[22] Filed: Oct. 11, 1994

[51] Int. Cl.⁶ .................................................. A62C 13/76
[52] U.S. Cl. ............................................. 248/75; 248/80
[58] Field of Search ................................ 248/75, 80, 87, 248/159, 364

[56] References Cited

U.S. PATENT DOCUMENTS

| | | | |
|---|---|---|---|
| D. 321,469 | 11/1991 | Pettesch | D8/356 |
| 509,227 | 11/1893 | Kirby | 248/364 |
| 512,087 | 1/1894 | Ashley | 248/364 |
| 1,586,465 | 5/1926 | Perdue | 248/80 |
| 2,872,142 | 2/1959 | Pottash | 248/80 |

*Primary Examiner*—Karen J. Chotkowski
*Assistant Examiner*—Anita M. King
*Attorney, Agent, or Firm*—Edward Dreyfus

[57] ABSTRACT

A hose retractor for gas stations and the like having an arcuate or goose-neck head portion extending through preferably a 90 degree arc and laterally extending from the vertical axis of the vertical standard portion. A removeable pulley-assembly or cartridge arcuately shaped to be inserted through the free end of the head portion, is inserted therein and secured by external bolts or other removeable fasteners when in the operative position. The cartridge preferably includes at least two, axially aligned cartridge pulleys to guide the cord along the head curvature. Upon damage or other need for replacement, the cartridge can be easily removed and replaced by a new cartridge, without the need to replace any other part of the retractor. The retractor standard and head portion according to one aspect of the invention can be made in a single piece with fixed orientation to reduce the costs of manufacture. If desired, the head portion can be made separately, of the same material as the vertical standard, and mounted for horizontal rotation through predetermined horizontal degrees on the top of the vertical standard.

20 Claims, 4 Drawing Sheets

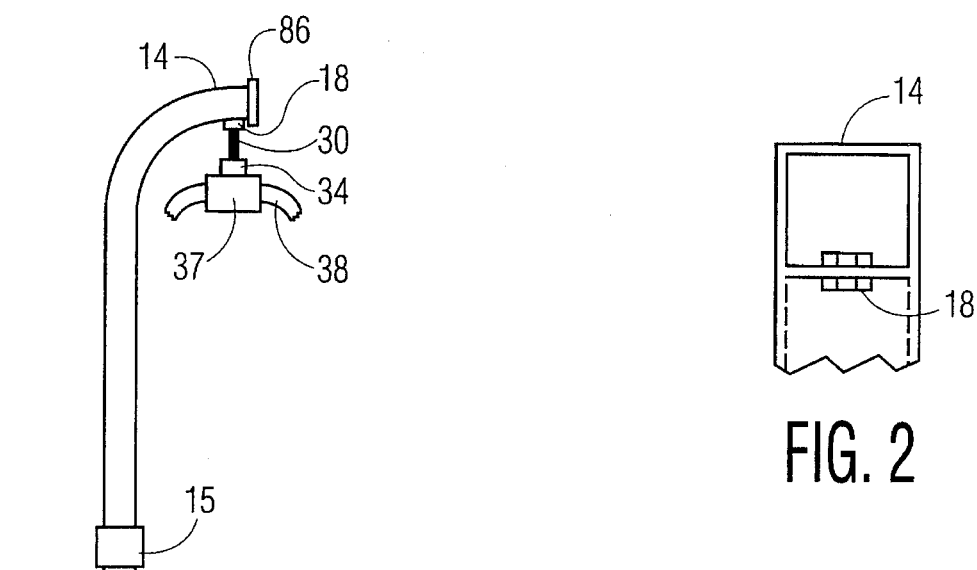
FIG. 2
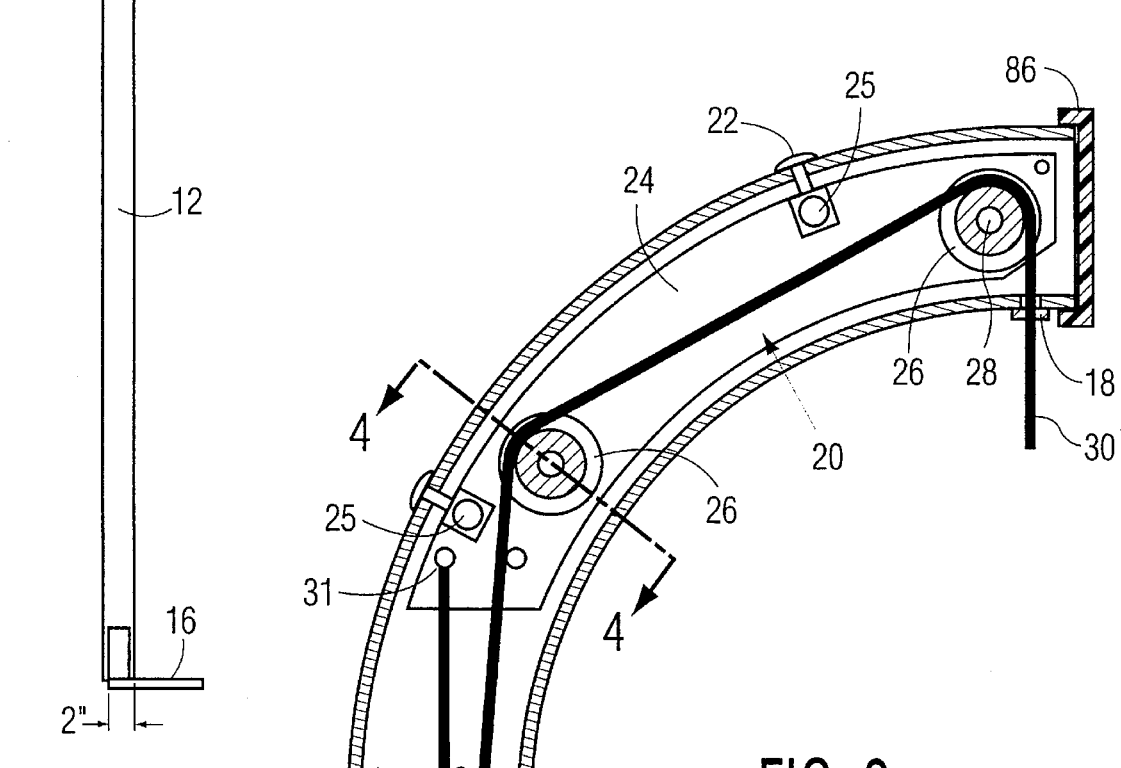
FIG. 1
FIG. 3

HOSE RETRACTOR

BACKGROUND

This invention relates to hose retractors and more specifically to apparatus for stowing and retrieving a hose or line, for example, of the type used in dispensing fuel at service stations.

Conventional hose retractors have been in use for many years and usually comprise a hollow, 7-foot vertical aluminum standard and a roller housing bolted or welded to the top of the standard. The roller housing is usually made of cast aluminum has a single roller permanently mounted therein for guiding the retrieving cable, and extends at right angles to the axis of the standard.

The cable extends up through the standard through the an opening in the bottom of the housing, along the guide roller and out an exit port located in the bottom of the housing. The external end of the cable connects to the hose mid-length and the internal portion runs down the standard, around a pulley connected to a 20 pound weight with the cable internal end connected to the standard. Thus the weight rides vertically within the standard in response to the tension on the cable.

During use, the operator pulls the hose to place the nozzle at a desired location thus applying tension on the cable external end. The cable pays out thus raising the weight inside the standard. After use, the operator relieves tension on the hose to replace the dispenser in its stowed position. The weight draws the cable back into the retractor, which, in turn, retracts the hose mid-length to its stowed position.

Although the orientation of the housing on some models is fixed relative to the standard, other models include a bearing mounted retriever designed to rotate 360° degrees in the horizontal plane at the top of the stationary standard. See, for example, U.S. Pat. No. 2,872,142 and Des. 321,469.

Conventional retractors experience several problems. For example, the guide roller in the housing eventually wear or otherwise become defective requiring the housing or the entire retractor to be discarded and replaced by a new unit. In addition, because of the length of the housing, i.e. slightly longer than the size of the single guide roller, the housing is relatively short such that the housing can not hold the cord significantly away from the vertical axis of the standard. Also, the standard and the housing are usually made of different materials, separately machined and connected by welding or bolting. These procedures require many steps and add to the over-all costs of the retractor.

Accordingly, it is an object of the present invention to provide a retractor that avoids the foregoing problems and provides other and further advantages and benefits more fully understood from the following descriptions.

SUMMARY OF EXEMPLARY EMBODIMENTS OF THE PRESENT INVENTION

One retractor that includes the principles of the present invention comprises a retractor having an arcuate or gooseneck head portion extending through preferably a 90 degree arc and laterally extending from the vertical axis of the vertical standard portion.

A removeable pulley-assembly or cartridge arcuately shaped to be inserted through the free end of the head portion, is inserted therein and secured thereto with bolts or other removeable fasteners when in the operative position. The cartridge preferable includes at least two, axially aligned cartridge pulleys to guide the cord. Upon damage or other need for replacement, the cartridge can be easily removed and replaced by a new cartridge, without the need to replace any other part of the retractor.

The weight suspends inside the standard portion from a pulley mounted near the top of the weight. The internal end of the cord is attached to the cartridge frame. The cord runs down around the weight-pulley, then upward along the cartridge pulleys and out the exit port.

The retractor standard and head portion according to one aspect of the invention can be made in a single piece with fixed orientation to reduce the costs of manufacture. If desired, the head portion can be made separately, of the same material as the vertical standard, and mounted for horizontal rotation through predetermined horizontal degrees on the top of the vertical standard.

Other and further advantages and benefits of the retractors according to the present invention will become apparent with the following detailed description when taken in view of the appended drawings, in which: DRAWINGS:

FIG. 1 is a schematic side view of one exemplary embodiment of the present invention.

FIG. 2 is a partial front view of the retractor head end of FIG. 1, without the cartridge in place.

FIG. 3 is a partial, side vertical section of the FIG. 1 retractor head portion.

DETAILED DESCRIPTION OF EMBODIMENTS

Figure 4:
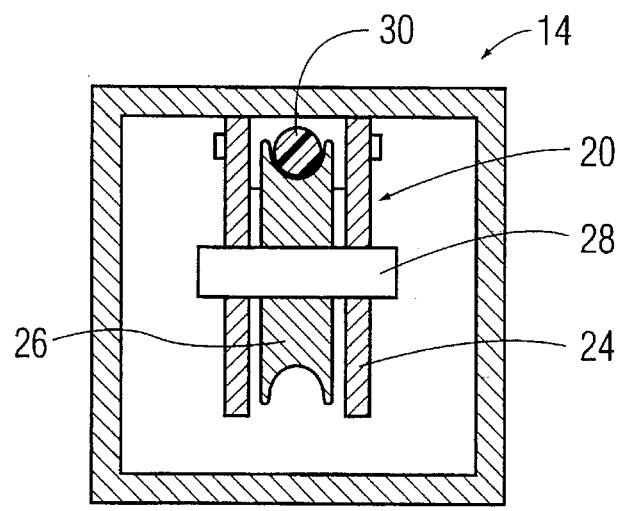
FIG. 4 is a section taken along line 4—4 of FIG. 3.
Figure 5:
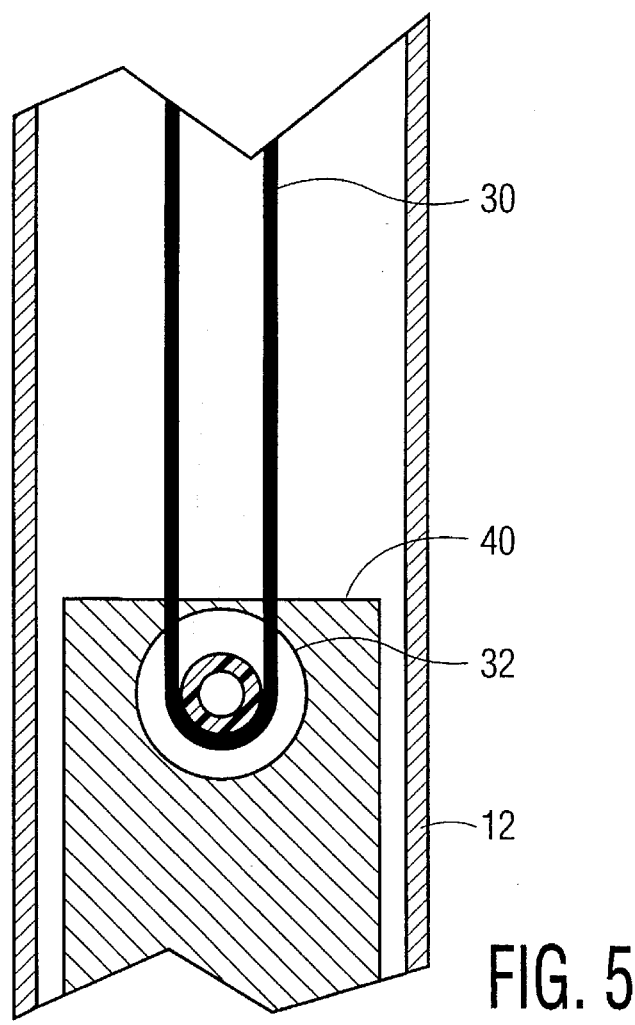
FIG. 5 is a partial vertical section showing the upper part of the weight inside the standard.

With reference to FIGS. 1–5, hose retractor 10 comprises an upstanding, vertical post or standard 12 terminating at its upper portion or head end 14 in a curved goose-neck type shape to provide ease of manufacture and displace the cable port from the standard as further described below. The standard and head portion are hollow throughout with openings at both ends and, preferably, generally square in cross section. The bottom of standard 12 conventionally terminates in a flange or foot plate 16 serving to mount in concrete base near the hose location such as the gasoline pump of a service station. A standard gas pump clamp, schematically shown at 15, mounts externally at the standard mid-length. A cable guide port fitted with a rigid nylon bushing 18 mounts through an opening in the underside of the free end of head portion 14. A removeable plastic cap (not shown) closes the opening of the free end of head portion 14.

Retractor parts 12 and 14 are made in a single piece from material such as cast aluminum, steel, hard plastic or other suitable material. Metals can be anodized, if desired, to provide any suitable color characteristics. In one example, the retractor 10 has the following approximate characteristics:

Retractor height: 7 Feet, 7 Inches

Material: extruded aluminum

Cross section: 1.8"×1.8" (outer dimensions)

Wall Thickness: 0.125 Inches

Head Arc: 90 Degrees

Internal Head Radius: 4.5 Inches

A roller or pulley assembly or cartridge 20 is removably mounted within the head 14, generally as shown, by two retaining bolts 22 extending through openings in the top of the head 14 and threaded into bracket nuts 25 which include pins mounted to the opposite sidewalls of frame 24 of cartridge 20.

Cartridge 20 comprises frame 24 sidewalls and grooved rollers or pulleys 26 mounted for rotation on axles or pins 28. Frame 24 and the alignment of pins 28 are curved to match the curvature of head 14. This combination facilitates the easy insertion and removal of cartridge 20 into and from its operational position in head 14.

A nylon cord or cable 30 has one end 31 connected or tied to the inner end of one of the frame 24 sidewalls of cartridge 20 at an opening therein, generally as shown. Cord 30 extends down standard 12, around the weight pulley 32, upward through standard 12, along the two grooved pulleys 26, downward and out through bushing 18, and terminates in a free-end connector 34, which when operable connects to a hose grip 37 fixed to the mid-length of hose 38. A 20 pound, iron weight 40 suspends from pulley 32 inside standard 12.

During assembly, retractor 10 can be laid flat on its side. Cable 30 is snaked through the head 14 opening so that a portion of its length extends through the bottom opening of standard 12. Pulley 32 is positioned on cable 30 and the weight assembly inserted into standard 12 from the bottom. The internal free end 31 of cord 30 is connected to cartridge frame 24. Cartridge 20 is then inserted through the head opening into operating position and secured therein by bolts 22. The external end of cord 30 is then inserted through bushing 18 and connector 34 attached so that the free end of cord 30 can not retract back through bushing 18.

Retractor 10 is then mounted vertically onto foot 16 which had been connected to the concrete with bolts or anchors (not shown). A plastic cap 86 is snapped to cover the head opening. Hose grip is then attached and the retractor is operational.

In the event a cartridge needs repair or replacement, cap 26 is removed, bolts 22 removed, and cartridge 20 withdrawn. Weight assembly 40 will simply rise in the standard 12 to enable the withdrawal of cartridge 20. Cartridge 20 can then be repaired or the cord 30 end 31 can then be connected to a replacement cartridge 20. The replacement or repaired cartridge 20 is then inserted into head 14 and bolted in place after which cap 26 is replaced.

Figure 6:
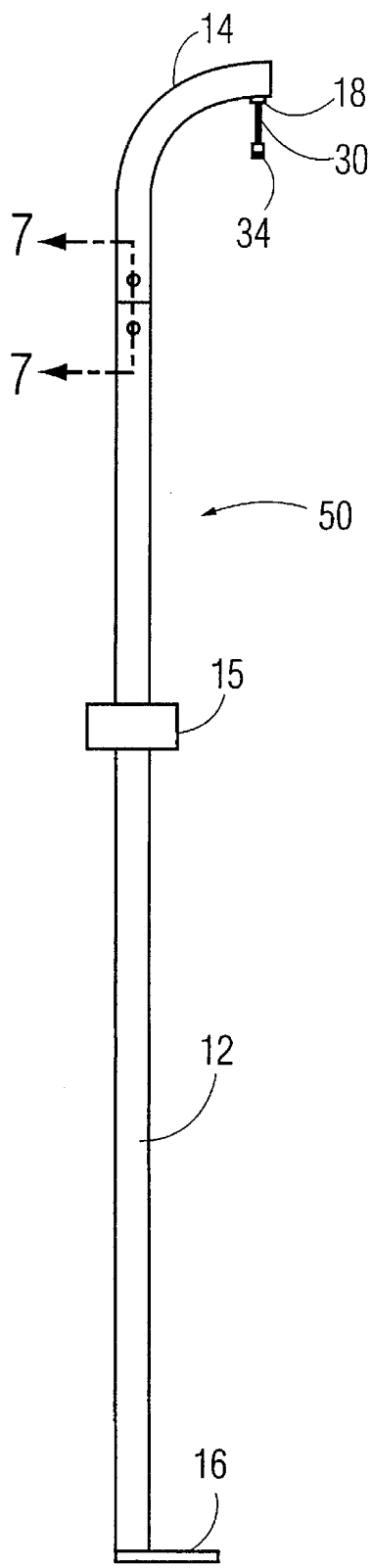
FIG. 6 is similar to FIG. 1 showing an alternate embodiment of the retractor.
Figure 7:
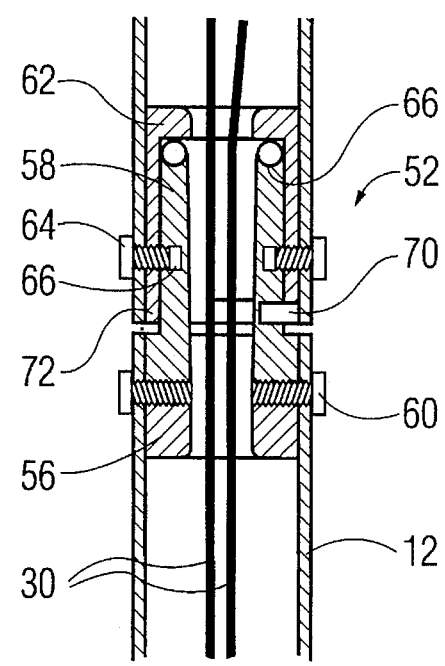
FIG. 7 is a vertical section taken along line 7—7 of FIG. 6.
Figure 8:
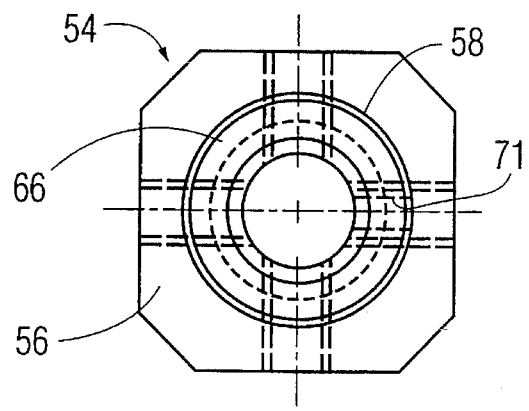
FIGS. 8 and 9 are plane views of the lower and upper sections of the bearing assembly shown in FIG. 7.
Figure 9:
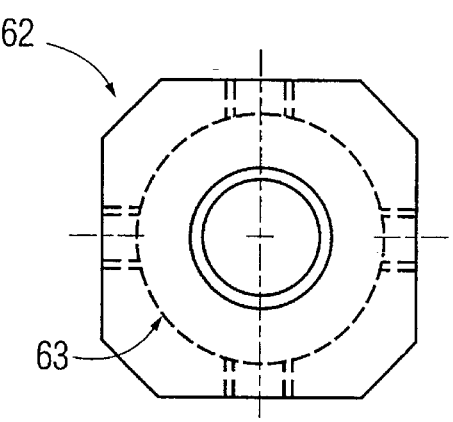
Figure 10:
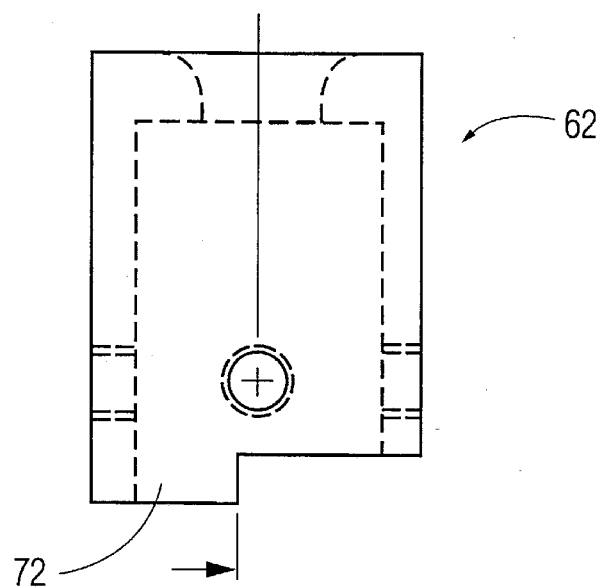
FIG. 10 is a side view of FIG. 9.

With reference to FIGS. 6 to 10, an alternate retractor 50 according to the principles of the present invention is preferably made from a single piece of extruded aluminum which is cut to form the head and standard. Head 14 is mounted for rotation on vertical standard 12 through any desired angle. In one example, a bearing assembly 52 couples the head to the standard and permits a head rotation of 180 Degrees, 90 degrees in each direction from a predetermined center position. This feature and the length of head 14 enables the gasoline dispenser and the hose to easily travel toward any direction from the position at which the gasoline dispenser is stowed, for example, to dispense gasoline to automobiles parked forward as well as aft of and on either side of the gasoline pump.

The bearing assembly 52 comprises casting 54 having a chambered, generally square lower section 56, sized to insert into standard 12 and a cylindrical upper section 58 extending into the lower part of the head 14. Section 56 mounts to standard 12 by bolts 60.

Assembly 52 further includes a championed, generally square upper section 62 sized to insert into the lower part of head 14 and mount thereto by bolts 64. Section 62 defines an internal cylindrical chamber 63 sizes to receive the upper section 56 rotatably therein. Section 62 defines groove 66 that enables the bolts to rotate without binding to section 56.

Section 56 defines a circular groove 66 at its top and ball or other suitable bearings ride in the groove 66 and support section 62 and therefore head 14 for rotation on stationary standard 12.

Both sections define a flared center, vertical opening to accommodate the unimpaired vertical movement of cord 30 as described above regardless of the angular relative position of the parts. Section 56 also comprises a stop pin 70 secured in seat 71. The bottom lip 72 of upper section 62 has a predetermined portion of its periphery removed to permit rotation relative to section 56 until one side or the other of lip 72 contacts stop pin 70. In one preferred example, 180 degrees of lip 72 is removed, permitting 90 degrees of head rotation from its center position aligned with foot 16.

It should be understood that various modifications can be made to the herein disclosed exemplary embodiments without departing from the spirit and scope of the present invention.

We claim:

1. A hose retractor comprising a standard portion for mounting in a substantially vertical position, a head portion having one portion coupled to the standard portion, said head portion having a substantial length curved upward and outward from said one portion, a cord-like member having at least one end portion extending external of said head portion for coupling to a hose, said member having a length extending internally through said head portion, retraction means for enabling the extension and causing the retraction of the cord-like member in response to tension forces applied to said end portion, a cartridge for guiding and reducing the friction for the cord-like member movement through the head portion, said cartridge being shaped to match the curvature of the head portion and being dimensioned for insertion into and removal and from the interior of the head portion, at least one securing member operable from the exterior of the head portion for releasably securing said cartridge in the head portion.

2. A retractor according to claim 1, wherein said standard portion and head portion are made of the same extruded material and are integral with each other and form a single-extruded piece.

3. A retractor according to claim 2, wherein the extruded material consists of one of the class of a metal, an alloy thereof, and a hard plastic.

4. A retractor according to claim 1, wherein said standard portion and head portion have the same uniform cross section throughout their substantial lengths.

5. A retractor according to claim 4, wherein said cross section comprises a substantially hollow square.

6. A hose retractor comprising a standard portion for mounting in a substantially vertical position, a head portion coupled to the standard portion, a cord-like member having at least one end portion extending external of said head portion for coupling to a hose-like device, said cord-like member having a length extending internally through said head portion, retraction means for enabling the extension and causing the retraction of the member in response to tension forces applied to said end portion, said head portion having one end generally aligned with said standard portion and its other end extending generally laterally from the standard portion, a substantial length of said head portion being curved upward and outward from the end thereof nearer to said standard portion, a cartridge having a frame and at least one cartridge member for guiding the cord-like member through the head portion, and wherein said cartridge is shaped to match the curvature of said head portion and is dimensioned for insertion and removal from the interior of the head portion.

7. A retractor according to claim 6, wherein said head portion is arcuately shaped.

8. A retractor according to claim 6, wherein said frame is releaseably mounted in an operative position inside the head portion, and said cord-like member having a length engaging the cartridge member.

9. A retractor according to claim 8, wherein said cartridge comprises two cartridge members spaced from each other along the length of said cartridge, and said cord-like member having a length for engaging both of said cartridge members.

10. A retractor according to claim 9, wherein said frame comprise a pair of spaced sidewalls and said cartridge members comprise at least two pulleys mounted for rotation between the sidewalls with their axes extending generally across the travel path of the cord-like member and engaging the sidewalls.

11. A retractor according to claim 6, wherein said at least one cartridge member is positioned toward the laterally facing end of the head portion, said head portion having a cord-like member exit port, and said cartridge member guiding the cord through a change of direction to align with and extend through said exit port.

12. A retractor according to claim 6, wherein said cartridge includes fastening receiving means, and said retractor further includes fastening means for releasably engaging said fastening receiving means operable from outside said head portion for releasably mounting said cartridge in an operative position within said head portion.

13. A retractor according to claim 6, wherein said standard portion and said head portion are made of the same extruded material and form a single-extruded piece.

14. A retractor according to claim 6, wherein said head portion is supported for rotation about an axis generally aligned with the standard portion through at least a predetermined arc.

15. A retractor according to claim 6, wherein said head portion is supported for rotation about an axis generally align with the standard portion through at least a predetermined arc.

16. A retractor according to claim 15, wherein said retractor includes an assembly having an upper part mountable on the head portion and a lower part mountable on the standard portion, a friction reduction device supported on said lower part for supporting said upper part and enabling low friction rotation between said parts.

17. A retractor according to claim 16, wherein one of said parts includes means for restricting relative rotation of said parts to a predetermined arc.

18. A retractor according to claim 6, wherein said cord-like member extends down through said standard portion, engages said retraction means, then up through said standard portion, and having its free internal end coupled to said cartridge at least when the cartridge is in an operative position.

19. A hose retractor comprising a standard portion for mounting in a substantially vertical position, a head portion coupled to the standard portion, a cord-like member having at least one end portion extending external of said head portion for coupling to a hose-like device, said cord-like member having a length extending internally through said head portion, retraction means for enabling the extension and causing the retraction of the member in response to tension forces applied to said end portion, said head portion having one end generally aligned with the top of the standard portion and its other end extending generally laterally from the standard, a substantial length of said head portion being curved upward and outward from the end thereof nearer to said standard portion, said head portion being supported for rotation about an axis generally aligned with the standard portion through at least a predetermined arc, an assembly having an upper part mountable on the head portion and a lower part mountable on the standard portion, a friction reduction device supported on said lower part for supporting said upper part and enabling low friction rotation between said parts, one of said parts comprising means for restricting relative rotation of said parts to a predetermined arc, said assembly being positioned inside the standard portion and the head portion and further including an upstanding opening to enable unimpaired, longitudinal movement of at least one length of said cord-like member.

20. A retractor according to claim 19, wherein said cord-like member extends down through said opening and up through said opening and having its internal end coupled to fixed place in said head portion when in an operative position.

* * * * *

UNITED STATES PATENT AND TRADEMARK OFFICE
CERTIFICATE OF CORRECTION

PATENT NO. : 5,593,116
DATED : January 14, 1997
INVENTOR(S) : Martin C. Pettesch, et al.

It is certified that error appears in the above-indentified patent and that said Letters Patent is hereby corrected as shown below:

Col. 5, Line 30, change "comprise a pair" to --comprises a pair--

Col. 5, Line 56, change "align" to --aligned--.

Col. 6, Line 54, after "to" insert --a--.

Signed and Sealed this

Twenty-fifth Day of March, 1997

Attest:

BRUCE LEHMAN

Attesting Officer

Commissioner of Patents and Trademarks